(12) United States Patent  
Raghavan et al.

(10) Patent No.: US 8,745,179 B2  
(45) Date of Patent: Jun. 3, 2014

(54) MANAGING MULTIPLE APPLICATION CONFIGURATION VERSIONS IN A HETEROGENEOUS NETWORK

(75) Inventors: Kollivakkam Raghavan, Saratoga, CA (US); Sandeep Kumar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1289 days.

(21) Appl. No.: 11/669,799

(22) Filed: Jan. 31, 2007

(65) Prior Publication Data

US 2008/0181131 A1 Jul. 31, 2008

(51) Int. Cl.
*G06F 15/177* (2006.01)
*G06F 15/173* (2006.01)
*H04L 12/24* (2006.01)

(52) U.S. Cl.
CPC ......... *H04L 41/0806* (2013.01); *H04L 41/0813* (2013.01); *H04L 41/0816* (2013.01)
USPC ............................ 709/221; 709/223; 709/224

(58) Field of Classification Search
CPC ............ H04L 41/0806; H04L 41/0813; H04L 41/0816
USPC .......................................... 709/223, 224, 221
See application file for complete search history.

(56) References Cited

U.S. PATENT DOCUMENTS

| | | | | |
|---|---|---|---|---|
| 6,499,107 | B1 * | 12/2002 | Gleichauf et al. | 726/23 |
| 6,968,377 | B1 * | 11/2005 | Gleichauf et al. | 709/224 |
| 7,150,044 | B2 * | 12/2006 | Hoefelmeyer et al. | 726/23 |
| 7,359,962 | B2 * | 4/2008 | Willebeek-LeMair et al. | 709/223 |
| 7,447,777 | B1 * | 11/2008 | Singh Ahuja et al. | 709/227 |
| 7,516,492 | B1 * | 4/2009 | Nisbet et al. | 726/27 |
| 7,688,727 | B1 * | 3/2010 | Ferguson et al. | 370/230.1 |
| 7,958,227 | B2 * | 6/2011 | Ahuja et al. | 709/224 |
| 8,078,971 | B2 * | 12/2011 | Ghattu | 715/736 |
| 2002/0176378 | A1 * | 11/2002 | Hamilton et al. | 370/328 |
| 2004/0181779 | A1 * | 9/2004 | Gorti | 717/120 |
| 2006/0114832 | A1 * | 6/2006 | Hamilton et al. | 370/244 |
| 2007/0058632 | A1 * | 3/2007 | Back et al. | 370/392 |
| 2007/0091804 | A1 * | 4/2007 | Pan et al. | 370/230 |
| 2007/0160062 | A1 * | 7/2007 | Morishita et al. | 370/395.31 |
| 2007/0192863 | A1 * | 8/2007 | Kapoor et al. | 726/23 |
| 2008/0037425 | A1 * | 2/2008 | Pan et al. | 370/235 |

OTHER PUBLICATIONS

Cisco Systems, Inc.. Cisco Application-Oriented Networking—A Network Embedded Intelligent Message Routing System. http://www.cisco.com/application/pdf/en/us/guest/products/ps6438/c1037/cdccont_0900aecd802c201b.pdf. Product Bulletin No. 2886. Last accessed Dec. 26, 2007.

(Continued)

*Primary Examiner* — Hieu Hoang
(74) *Attorney, Agent, or Firm* — Schwegman Lundberg & Woessner, P.A.

(57) ABSTRACT

A system that enables automatic version provisioning in heterogeneous application oriented network (AON) architectures is provided. Generally, the specification enables appropriate version configurations to be selected at runtime as needed in an AON environment. More particularly, the subject specification describes the ability of a device (e.g., AON node) to perform and/or select a self-configuration operation based upon the environment and the runtime operation. To facilitate message-based runtime instantiation of the appropriate configuration, the system enables network applicable configurations to be pushed to each of the nodes in the AON architecture.

28 Claims, 8 Drawing Sheets

(56) References Cited

OTHER PUBLICATIONS

Cisco Systems, Inc. Application-Oriented Networking—A Flexible Application Infrastructure. http://www.cisco.com/en/US/products/ps6692/Products_$_{Sub}$_Category_Home.html. Last accessed Dec. 26, 2007.

Grid Today. Cisco Unveils Application-Oriented Networking. Jun. 27, 2005. http://www.gridtoday.com/grid1405057.html.

Hadi Bannazadeh, et al. On the Emergence of an Application-Oriented Network Architecture. http://ieeexplore.ieee.org/Xplore/login.jsp?url=/iel5/4273393/4273394/04273409.pdf&arnumber=4273409. Last accessed Dec. 26, 2007.

"Deep content inspection—Wikipedia", [Online]. Retrieved from the Internet: <http://en.wikipedia.org/w/index.php?title=Deep_content_inspection&printable=yes>, (Accessed Oct. 25, 2011), 6 pgs.

* cited by examiner

MANAGING MULTIPLE APPLICATION CONFIGURATION VERSIONS IN A HETEROGENEOUS NETWORK

TECHNICAL FIELD

The subject disclosure relates generally to application oriented network (AON) environments, and more particularly to configuration management in AON architectures and systems.

BACKGROUND

Today, in an effort to maximize efficiency while minimizing expense, business applications tend to require tighter integration with the other applications due to changing business needs and demands. Consequently, the applications often require business logic changes, tweaks, upgrades and maintenance. Conventionally, these logic changes, tweaks, upgrades and maintenance are performed manually by administrators and are therefore costly to both the organization as well as performance of the overall system. Furthermore, management of the applications is presented with obstacles for example, many of these applications belong to different departments, clients, partners, business units, vendors and/or are deployed in branch-offices, partner networks, DMZ (demilitarized zone), internet, WAN (wide area network), intranet, etc.

In an effort to alleviate issues with such deployments, recent developments employ an AON (application oriented network) based overlay application network that provides significant cost-savings to application infrastructure owners in an enterprise, by allowing these end-points to offload some of the critical application infrastructure and business logic functions to AON nodes. AON involves network devices designed to aid in computer-to-computer application integration.

These recent developments in AON technology were popularized in response to increasing use of Web services based applications, need to connect and carry out transactions between the legacy and new class of XML (extensible markup language) and Web services based applications, XML messaging combined with related standards such as XSLT (extensible stylesheet language transformation), XPATH (XML path) and XQUERY (XML query) to link miscellaneous applications, data sources and other computing assets. In accordance with the AON mechanisms, many of the operations required to mediate between applications, or to monitor their transactions, can be built into network devices that are optimized for the purpose.

DESCRIPTION

Overview

The following presents a simplified overview in order to provide a basic understanding of some embodiments described herein. This is not an extensive overview of the embodiments described herein. It is intended to neither identify key or critical elements of the embodiments nor to delineate the scope of that specification. Its sole purpose is to present some concepts in a simplified form as a prelude to the more detailed description of example embodiments that is presented later.

The specification, in one aspect, relates to systems and methods that enable appropriate version configurations to be selected at runtime as needed in an application oriented network (AON) environment. More particularly, the embodiments describe the ability of a device (e.g., AON node) to perform and/or select a self-configuration operation based upon the environment and the runtime operation. As used herein, in an AON environment, a 'configuration' refers to static data that enables AON runtime to load and operate as well as the logic, capability and policies associated therewith. It will be understood that this logic, capability and policies can be considered an integral part of an AON configuration. Accordingly, it will be understood that because network devices or nodes need not be configured identically and each network element may evolve over time with different configurations and images, the heterogeneity of the network increases thereby making multiple version configurations present within a single network.

Embodiments can address the disparate configuration aspects of the heterogeneous network by selecting an appropriate configuration that corresponds with the node at runtime. There are at least two example aspects addressed herein. The first aspect is directed to signaling to the data plane about how to use the appropriate format. Additionally, a second aspect addresses the concepts of one AON device or network element knowing about the capabilities of the other AON devices.

The following description and the annexed drawings set forth in detail certain illustrative embodiments. These embodiments may be indicative, however, of but a few of the various ways in which the principles of the disclosed technology may be employed and are intended to include many and/or all such embodiments and their equivalents. Other advantages and novel features of the technology will become apparent from the following description of example embodiments when considered in conjunction with the drawings.

Description of Example Embodiments

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
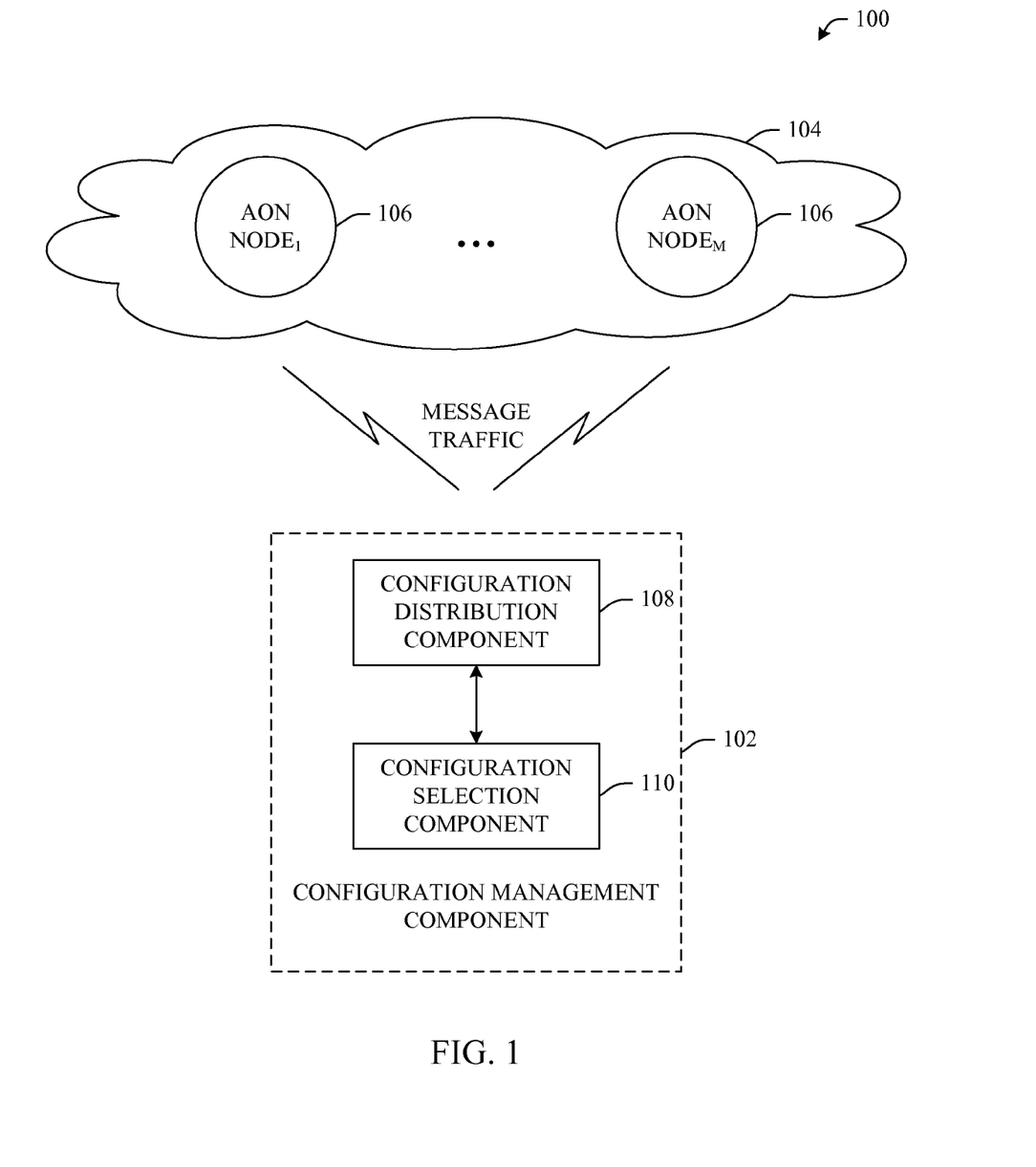
FIG. 1 illustrates a block diagram of an example system that facilitates runtime selection and deployment of configurations in an application oriented network (AON) environment.

Referring now to the figures, FIG. 1 illustrates a system 100 that facilitates configuration management in accordance with an aspect of the specification. Although the aspects described herein are directed to an application oriented network (AON) brand architecture, it is to be understood that the systems and methods described herein can be applied to other application oriented networks beyond the AON-brand architectures. As such, these additional aspects are to be included within the scope of the disclosure and claims appended hereto.

Generally, system 100 can include a configuration management component 102 that provides configurations (e.g., configurations and policies) to an AON network 104 having 1 to M AON nodes associated therewith, where M is an integer. It is to be understood that 1 to M AON nodes can be referred to collectively or individually as AON nodes 106. As used herein, an AON node 106 refers to the individual devices and associated applications that process messages in an AON environment.

In an aspect, the device or network element (e.g. node) 106 can be initially pre-loaded with a bootstrapping image which, upon power cycle, connects to a previously configured 'configuration and management server' (or configuration management server 102) from which it loads the initial set of capabilities. It will be understood that different versions of the same functionality/capability may be resident on the device 106 and available for future use 'triggered' by an event and/or 'selected by a rule' at runtime. Additionally, an event may be triggered based on the arrival of a message at the network element, and upon deep content inspection of the application message, the value of inspected content fields could be used to evaluate rules.

In a more particular example, assume that there are three devices (106), A, B, and C. Further assume that the devices (106) B and C support v1 and v2, respectively. The device (106) A is capable of handling both versions v1 and v2 and has to conduct message transactions with both of the devices (106) B and C in a compatible way. An external user can dynamically configure Policy Execution Plans (PEPs) (or AON flows as in AON embodiment) outside of the device 106 and prompt upload of them dynamically onto the device 106.

It is to be appreciated that there are use cases where the same higher level policy (as defined by a PEP) is to be applied for an application message that uses different versions of the 'same' capability. An example is 'transformation' of an inbound message based on the nexthop target device's version at device A based on target destination of device B and C. Each device 106 that has this capability carries with it metadata information in the form of an XML (extensible markup language) file that describes the version selection rules. A rules engine can be provided that evaluates the version data at runtime to select the most appropriate version for each managed configuration item.

Upon arrival of the message at the device 106, the device can fully terminate the application transport protocol, decrypt the content at the protocol level (as in SSL/TLS) (secure sockets layer/transport layer security), assemble the message content, decode the content (as it may be encoded as in MIME (multipurpose internet mail extension) content in an HTTP (hypertext transfer protocol) based message, for example), decrypt the message content if necessary, and apply deep content inspection to compute a message type that is bound to a 'version' of the capabilities. Once the message type and version information is selected, an appropriate PEP configuration can be invoked.

Although the configuration management component 102 is illustrated as a stand-alone centralized component, it is to be understood that all or a portion of the components and corresponding functionality included within the configuration management component 102 can be deployed within one or more of the AON nodes 106. These alternative architectures are to be included within the scope of this disclosure and claims appended hereto.

As described above, recent developments in AON architectures address many of the management issues associated with application compatibility. However, conventional systems do not address the ability to provide policies and configurations as the heterogeneity of the network (e.g. network 104) evolves. In other words, as multiple versions of applications become available and therefore employed by nodes (e.g., 106) within a given architecture (e.g., network 104), conventional AON systems are not able to account for these differences in policies and/or configurations.

As described supra, in conventional AON systems, the rules, policies and configurations for performing operations, also expressed in XML (extensible markup language), are manually specified separately and downloaded as required. As described herein, it is to be understood and appreciated that AON nodes 106 can be deployed with policies and relevant configuration information from a centralized management system. This centralized management system can often manage hundreds and thousands of AON nodes (106) spanning across an enterprise including data center and branch-offices.

The subject specification addresses issues that can arise due to a large-scale deployment of AON nodes (106) both from run-time as well as from a configuration and monitoring perspective. Each of these general concepts will be described in greater detail with regard to the figures that follow. As stated above, it is to be understood that the functionality described herein can be applied to most any AON without departing from the spirit and/or scope of the subject specification and claims appended hereto.

As shown in FIG. 1, the configuration management component 102 can include a configuration distribution component 108 and a configuration selection component 110. As will be described, the configuration distribution component 108 can facilitate distribution of all available and/or applicable configurations to AON nodes. Thereafter, the configuration selection component 110 can be employed to select and initiate the appropriate configuration at runtime as a function of message traffic.

The very nature of the off-loaded application functions for the applications to the AON nodes 106 are also subject to similar evolution mentioned above. Besides, as more and more application traffic passes through the AON nodes 106 and the AON nodes 106 collaborate on a message path basis, the AON nodes 106 at run-time can select the appropriate version(s) of the policies and configurations, as well as apply compatible policies on a per message by message basis. In other words, one particular aspect of this specification provides for a configuration selection component 110 that enables backward and/or forward compatibility with regard to policies and configurations. As will be understood, this is a manageable drawback in view of the evolution of the endpoints themselves.

Another fundamental problem that is posed by the conventional network and application management system for managing AON nodes is that policies and/or configurations should be monitored and/or tracked in order to effectively provide these policies and/or configurations to the nodes for runtime instantiation. As policies and configurations in the AON network nodes 106 (both the homogeneous and heterogeneous physical form factors) evolve, it can be particularly helpful to monitor and/or track these different policies and/or configurations thereafter making them available to the individual nodes 106. This runtime ability is disclosed herein in connection with the subject configuration management component 102.

Figure 2:
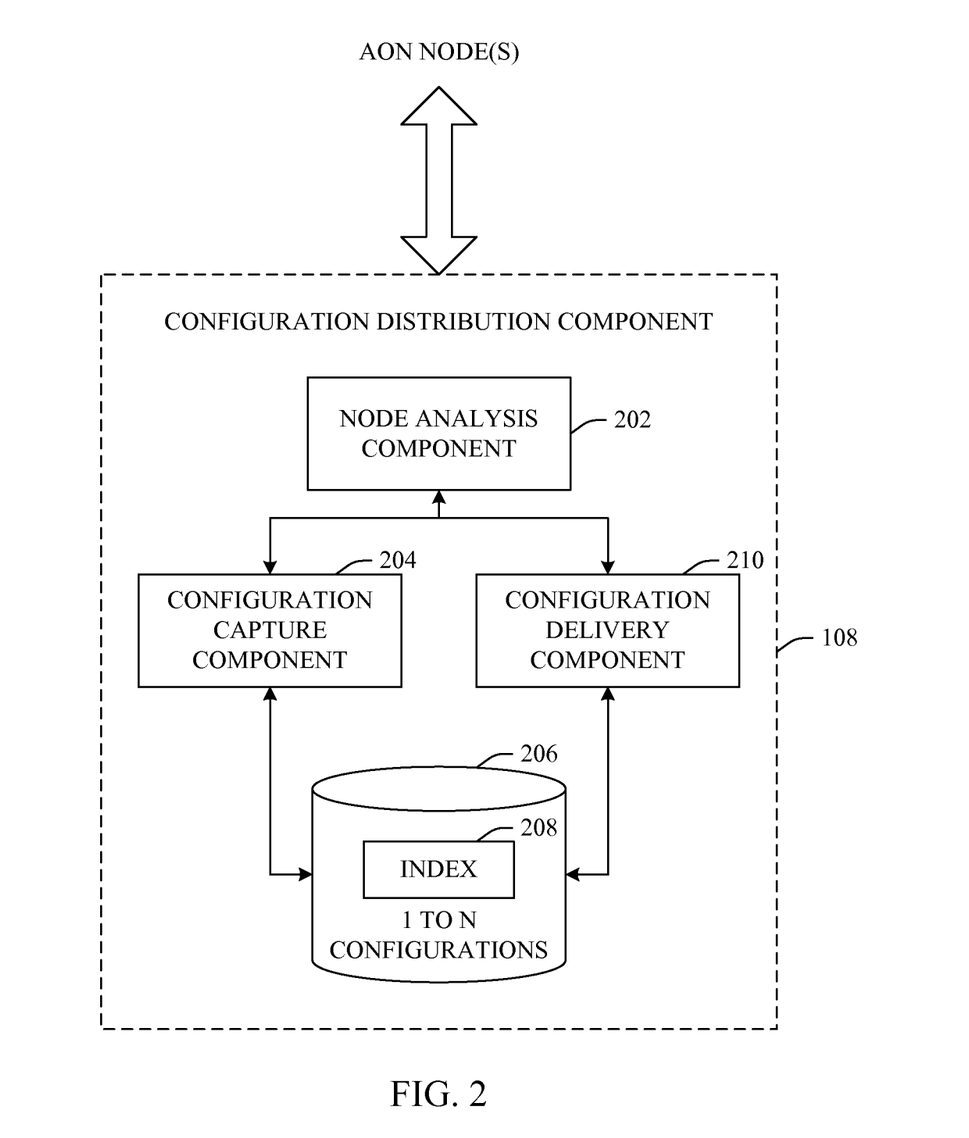
FIG. 2 illustrates an example configuration distribution component that facilitates pushing network applicable configurations to each node within a network.

FIG. 2 illustrates a block diagram of an example configuration distribution component 108. As shown, the configuration distribution component 108 can include a node analysis component 202 that monitors nodes 106 to enable identification of appropriate configurations and/or policies. In other words, in one example, when an AON node 106 is tied to different application paths, the node analysis component 202 can monitor and/or track different configurations (e.g., software images, configurations, versions, relevant artifacts, policies etc.) of each connected node 106. With a large number of network nodes 106, it will be understood and appreciated that this problem can rapidly become more complex. The subject specification discloses the node analysis component 202 that can track these software images, configurations, versions, relevant artifacts, etc. and subsequently make the versions available for deployment as appropriate.

In operation, a configuration capture component 204 can be employed to identify and store 1 to N configurations into store 206, where N is an integer. Additionally, the configuration capture component 204 can generate and maintain an index 208 or manifest of all available configurations. This index 208 can be maintained within a store 206 along with the 1 to N configurations or maintained in a distributed model, for example, within each or a subset of the nodes (106 of FIG. 1). Still further, the configurations can be maintained and/or distributed within most any accessible location as desired or preferred.

Subsequently, a configuration delivery component 210 can be employed to transfer or push available configurations to each of the nodes 106. As will be understood upon a review of the figures that follow, the configuration selection component (110 of FIG. 1) can employ the index 208 in order to identify and instantiate the appropriate configuration at runtime. The example architecture of FIG. 2 illustrates an automated configuration identification and capture technique. It is to be understood that, in alternate examples, an external tool can be used to load or identify appropriate configurations 206 (and related index 208). These alternative examples are to be included within the scope of this specification and claims appended hereto.

Figure 3:
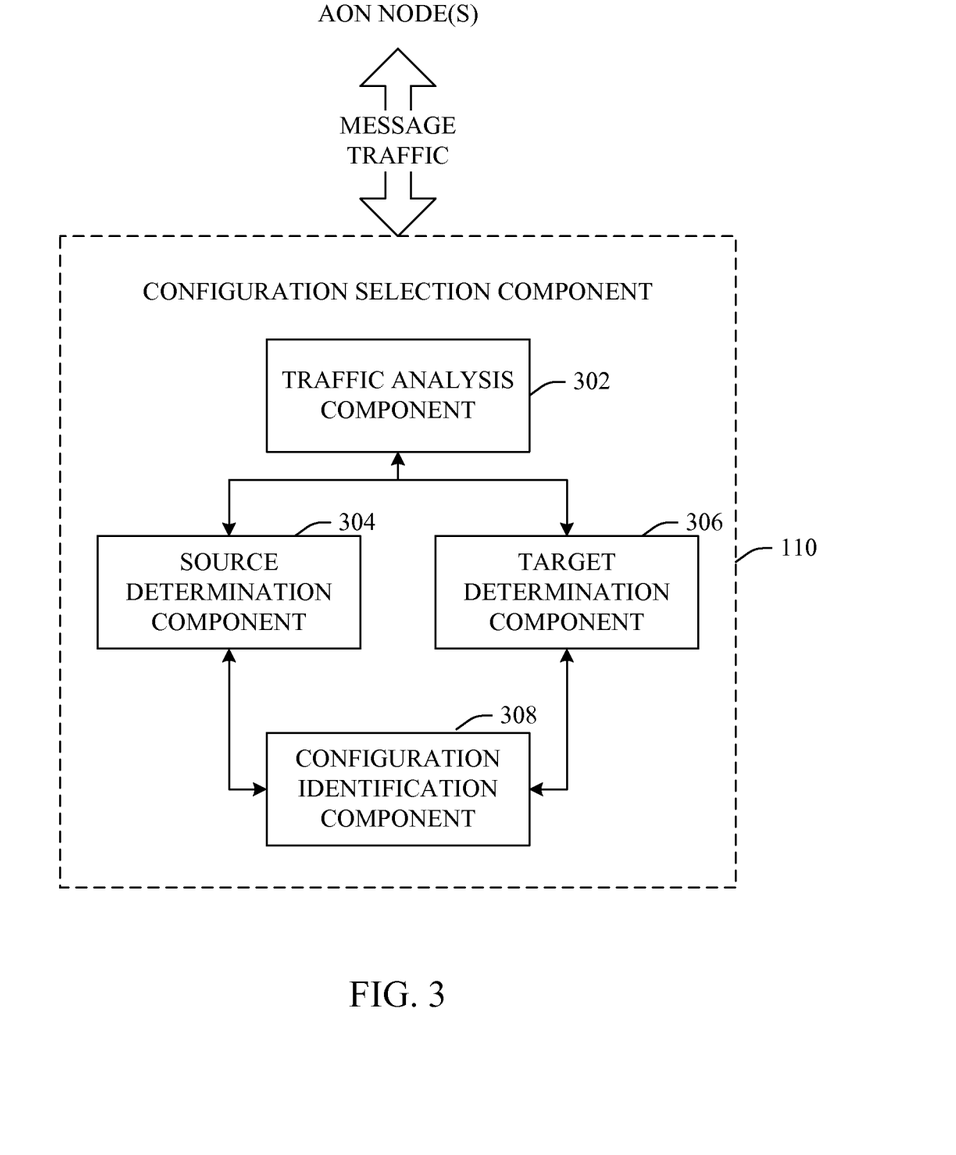
FIG. 3 illustrates an example configuration selection component that facilitates runtime configuration selection in an AON network environment.

FIG. 3 illustrates a block diagram of an example configuration selection component 110 in accordance with an aspect of the specification. Generally, configuration selection component 110 can include a traffic analysis component 302 that can be used to monitor traffic between AON nodes 106. As illustrated, the traffic analysis component 302 can employ a source determination component 304 and a target determination component 306 in order to identify a relevant path of the traffic.

Subsequently, a configuration identification component 308 can be employed to determine an appropriate configuration(s) based upon information gathered by the determination components (304, 306). For instance, a specific version can be identified, thus, the configuration identification component 308 can be employed to direct the AON node(s) 106 of which configuration to employ. As described above, all available configurations can be pushed to each node 106 thereby making them available for use at runtime.

It will be understood that the ability to track application interactions is vital to a network administrator. Most often, the network administrator works best with a comprehensive analysis of the network performance and application interaction as a function of response times. Given the network and application analysis, the network administrator would be able to pinpoint bottlenecks in the network, unresponsive or overloaded applications, application interactions, etc. However, conventionally, gathering the information needed to perform such an analysis is difficult because of dissimilar server hardware and software, differing message formats and/or application layer protocols, etc. The subject specification further can address this issue by providing rich monitoring and reporting of the network via the traffic analysis component 302.

In a heterogeneous network, where different network nodes and different software image versions are present, the configuration of each node 106 must be accomplished independently. Conventionally, the administrator or team responsible for the configuration has to remember and configure each network node differently depending on the version of the node, often having to remember the different configuration options. As will be understood, in large networks, with many different versions, this problem gets very complex rapidly and, in the case of conventional systems, is error prone due to the manual nature of the configuration.

Traditional approaches to this problem rely upon manual methods to track and administer the different configurations. Server approaches propose tying cooperating servers together by having each server monitor its incoming and outgoing traffic and later correlate the aggregated information. One drawback to this approach is that each server must be modified to intercept messages between applications and thereafter analyze the messages to determine configurations.

In addition, with regard to traditional approaches, cooperating servers must communicate and transfer analysis data to a central server for overall analysis. Contrary to the distributed approach of traditional systems, the subject specification discloses a centralized technique (e.g., traffic analysis component 302) for gathering message data for analysis. As such, server modification is not necessary. Rather, the traffic analysis component 302 can determine appropriate configurations thereby prompting the node(s) 106 to instantiate the proper configurations. As discussed supra, the subject specification describes systems and methods of pushing available representations (e.g., configurations) to each node 106 whereby, the node 106 can employ the appropriate representation at runtime.

As described in detail above, AON is an application-specific technique of processing application messages in a network. Following is an overview of the AON concept in order to add perspective to the specification described herein. It is to be understood that this overview is not intended to limit the specification in any way.

Essentially, as application messages are processed in the network, there are policies that are defined for the application that is sending the message as well as the application that is receiving the message. In general, AON (and any other application oriented processing generally) can be described as a network element which has embodiments in the form of an appliance, a blade, a router blade, a switch blade, etc. Basically, traffic that is flowing through the network can be centrally managed based upon certain configurations in the network, such as, classes of messages, source and target locations, etc. By way of example, messages going to a particular port on a host server can be regulated such that all of the HTTP (hypertext transfer protocol) messages should be processed in some predetermined manner.

Once the packets of messages are received at the AON system, at runtime, all of the packets can be intercepted and assembled by TCP (transport control protocol) determination and built to recreate the entire message. When the entire message is built, based upon the destination and source, the message can be handled in a particular predetermined manner. It will be understood that these are all configurable message classification concepts. Essentially, the traffic analysis component 302 can perform deep content inspection and classification. Although the example above describes a scenario of HTTP messages, it is to be appreciated that the specification can be applied to most any protocol including, but not limited to HTTP, JMS (Java message service), MQ (message queuing), SMTP (simple mail transfer protocol), etc.

One aspect of the specification describes messages directed to business application transactions. In this scenario, as messages are received, there are classification policies that look for specific things in specific places in order to determine how to manage the message. For example, in HTTP, the system can specify to look in headers or, in accordance with other protocols, in JMS headers, MQ headers, etc. for specific property values.

In these examples, the inspection can be employed using XPath or most any XML (extensible markup language) query type language. Thus, a deep content inspection can be applied, or alternatively a structural query applied, on the entire message (e.g., element matching, value matching, structure matching). By way of further example, the system 100 can determine that a message appears to be a purchase order, therefore, a specific action should follow. It will be appreciated that in AON systems, message classification is extremely rich.

Conventionally, deep packet inspection is generally known but, these traditional systems looked for messages across packets. They may look at 100 or 200 packets but, they did not look at these packets in the totality of a message. Additionally, with AON, it is possible to mine messages across protocols. For example, the inspection can be on the HTTP header as well as the SOAP (simple object access protocol) header which is actually within the HTTP body. Thus, a query can be constructed that expresses criteria for match to the HTTP header as well as the SOAP body.

Thus, the analysis of the specification does not limit to a number of bytes in an HTTP message in looking across all of them. Additionally, the system can be used to inspect an encoded message within a MIME (multipurpose internet mail extension) attachment by looking at the content within the attachment. In the past, this action must be completed at an application end point rather than accomplished within the network as described herein.

In operation, a user can employ external tools such as a management station and design studio to define higher level policies. For instance, these policies can define how to accomplish the message classifications or find the message type. Over the course of time, it will be appreciated that new versions of these devices arrive or become available. Accordingly, heterogeneity is built over time. At this point, it will be understood that it is particularly useful to manage and make available configurations that correspond to message traffic.

From a centralized management station, a policy designer can figure out what capabilities are supported because not all capabilities (e.g., top level message policies) are supported in all platforms. Here, the specification discloses systems and methods to make available all appropriate configurations associated to a heterogeneous network of nodes. Thus, the appropriate configuration can be employed at runtime without the need to transmit the configuration just-in-time. Rather, the configurations can beT pre-pushed to each of nodes 106 to be available at runtime.

For example, a management system may be reachable from the data system but, not reachable from the branch office. Because of this application level system processing, other libraries are required to connect to other devices to employ the capability. From the management perspective, this becomes a complex task. For instance, if the user is dealing with thousands of devices, it is necessary to determine what library, what configuration, what it can connect to, etc. for each device. This is a basic problem, however, the scalability problems associated with managing these types of devices and when their versions evolve over time also add to configuration available issues.

As described supra, the specification eases the configurability aspects by placing the burden on which library to use at runtime. In other words, a portable, self-describing, self-extracting format can be established for storing configurations and policies to simplify the provisioning, management and maintenance of these configurations and policies associated with an AON device 106.

As such, the administrators will not have to be concerned with employing the correct library, etc. In other words, the system pushes all of the configurations and policies to all of the devices (e.g., nodes). Thus, once an analysis is performed and a configuration is identified, the decision of which configuration to employ at runtime is left to the runtime entity.

Effectively, the specification herein describes a mechanism to distribute an archive file, for example, with multiple contacts, for multiple applications with multiple configurations. Thereafter, the device can instantiate the correct configuration for the right application as a function of message (e.g. traffic) analysis. In other words, the system pushes all configurations to each device and employs late binding techniques to instantiate the correct configuration and version thereof.

The instantiation of the correct configuration is performed at the time the message arrives. Therefore, when the message arrives, it is possible to determine which entity is being dealt with (e.g. branch office, particular location, particular reachable locations). Accordingly, the correct configurations can be instantiated since all configurations are available within each node 106 of the system.

It is to be understood that, contrary to conventional server based systems, the subject system performs the analysis, configuration identification and instantiation in the network. Described herein is a portable self-extracting and self-describing configuration format that allows application policies (e.g., configurations) to be provisioned to any node in a heterogeneous network consisting of AON devices at different image versions.

The described system can particularly simplify provisioning and management of configuration data. As described above, the system can eliminate manual maintenance and knowledge of configuration versions associated to a heterogeneous network while eliminating errors due to incorrect provisioning of node configuration(s). Thus, nodes can be 'forward' and 'backward' compatible with regard to versions. In other words, for example, if the node finds a more appropriate representation of a configuration based on the rules defined in the manifest or index, the node can use it even if the version of the configuration is higher than the version of the node.

Figure 4:
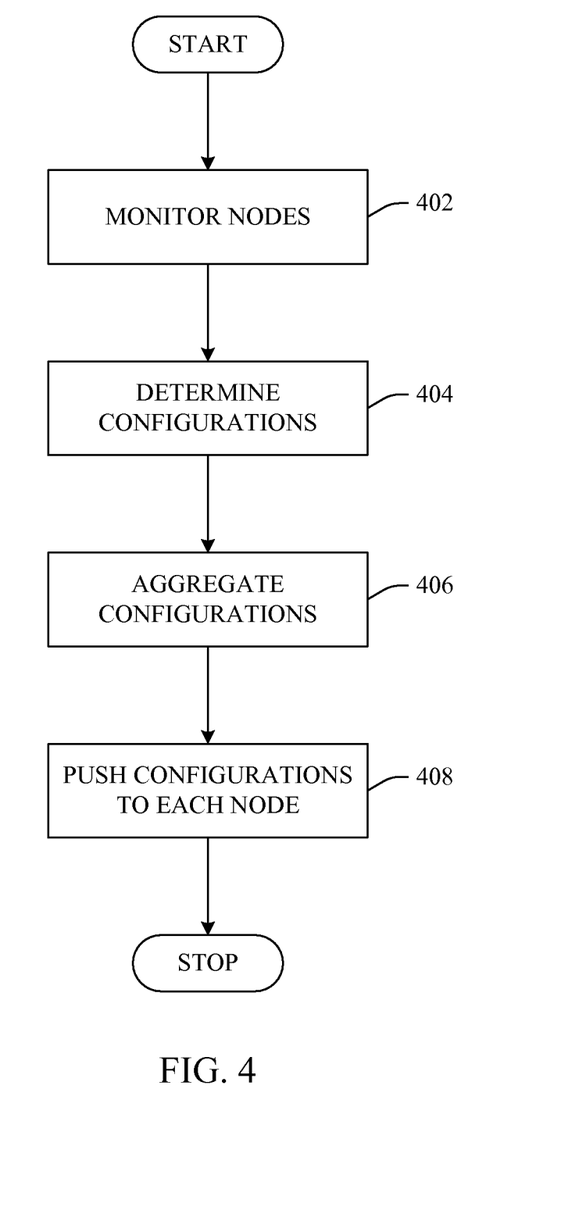
FIG. 4 illustrates an example flow chart of procedures that facilitate pushing configurations to AON nodes in accordance with an aspect of the specification.

FIG. 4 illustrates a methodology of populating nodes with configurations that correspond to a network in accordance with an aspect of the specification. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

At 402, the nodes can be monitored with regard to application version configurations. For example, the system can actively monitor nodes added to a particular network thereby capturing the configurations associated to each of the nodes in the network. Accordingly, at 404, applicable configurations can be identified and aggregated at 406. In other words, in addition to the configurations being aggregated, a manifest or index can be established that maps each configuration to a particular node(s) in a network.

Alternatively, a user can employ a design tool in order to establish applicable configurations that correspond to a heterogeneous network. In either case, the configurations can be pushed or transferred to each node at 408. As described above, by pushing configurations to the nodes, the system is able to select and employ the appropriate configuration(s) at runtime as described with reference to FIG. 5 that follows.

Figure 5:
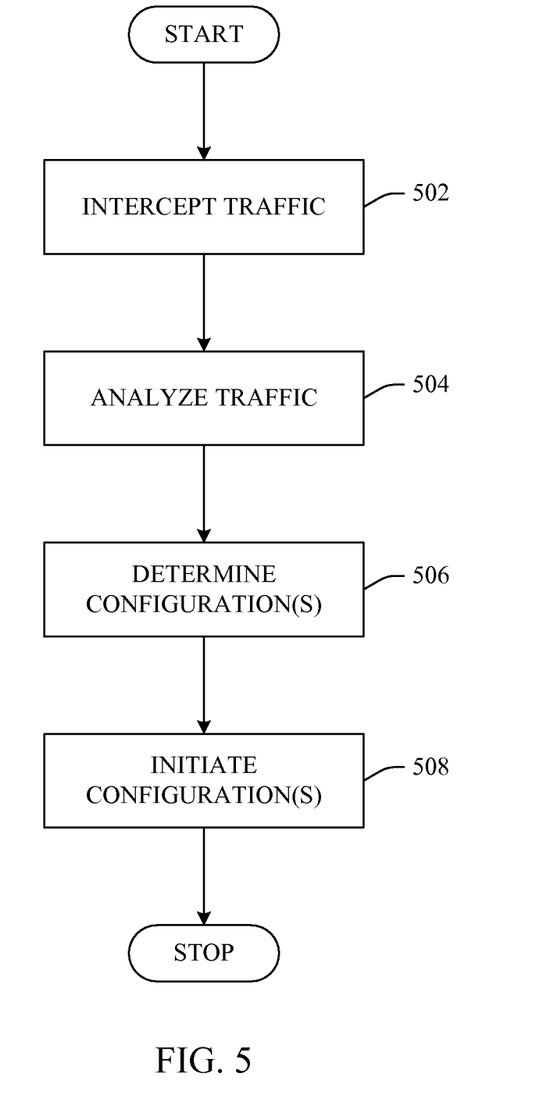
FIG. 5 illustrates an example flow chart of procedures that facilitate selecting and initiating the appropriate configuration(s) as a function of node capabilities.

Turning now to FIG. 5, an example flow diagram of procedures of analyzing traffic and instantiating the appropriate configurations in accordance with the particular nodes. At 502, traffic between the nodes can be intercepted and analyzed at 504. In one example, deep packet inspection can be employed upon the traffic. This analysis can determine the source and target for the traffic as well as the traffic type.

Accordingly, at 506, the appropriate configurations can be determined. As described above, a manifest can be employed to determine the appropriate configuration(s). Because the configurations are pre-pushed to each node, the configuration can be instantiated at runtime following the analysis.

The approach described herein is defined for enabling enrichment of the data plane capabilities of the application offload functions in the network device. In one aspect, the described approach employs XML for describing the manifest, runtime capabilities, and its extensions to capabilities, for its use in conjunction with packaging technology. Moreover, the described approach can employ a common model for both the configuration and monitoring agent on the network device, as well as the runtime entity that affects the data plane policies for the application message traffic.

It is to be understood that the approach can be applied centrally or in a network device (e.g., node) that simultaneously understands L2-L3 and L5-L7+ layers for application messages such as HTTP/SOAP+XML, FTP, JMS/SOAP+XML, MQ etc. One particularly useful aspect is in the fact that due to run-time capabilities as designed, these configured and provisioned though 'versioned' items are simultaneously active at a given moment at run-time for different policies. Moreover, the notion of 'version' is not limited to configuration revision; it can also apply to creating messages that can be understood by the other AON nodes that may have different capabilities.

The following scenario is provided to add perspective to the specification. As such, this scenario is not intended to limit the scope of the specification and/or claims appended hereto. With regard to the example scenario, consider a management console (MC) which manages two network nodes N1 and N2.

Initially, N1 and N2 are both at version v1 and have some running configuration, for example, C1. Assume now that N1 is upgraded to version v2 and configuration C1 is changed on the MC to C1'. The administrator now provisions C1' to both nodes N1 and N2. Subsequently, the configurations are stored in an archive format (e.g. in the JAR (Java Archive) file sense) such that C1' contains both representations, specifically, the v1 compatible version as well as v2 compatible version.

The archive file contains a manifest that describes the mapping between the version and the JAR file entry that corresponds to that version. It will be understood that using a JAR file allows multiple versions to coexist simultaneously. In one embodiment, at runtime, Node N1 uses its version number (e.g. deployed as part of an image) to extract the correct representation by first reading the manifest, identifying the correct configuration entry and then reading that entry.

Node N1 would therefore pick the v2 configuration since it was upgraded to version v2 but, N2 would select the entry corresponding to v1 for the same configuration entity. Note that the rules for identifying the correct version can be more complex than described here and can also be different for different image versions. If a compatible version is not found, the selection process can automatically retrieve the most recent version which is also available in the manifest and implemented in the selection rules.

Now if N2 is upgraded to v2, the same process would result in N2 now selecting v2 version of the configuration data. If any of the nodes were downgraded to v1, the older version of the configuration would be picked up without requiring a full backup and restore of the old configuration, that is, assuming configuration changes are still to be retained and reason for downgrade is purely related to code.

Figure 6:
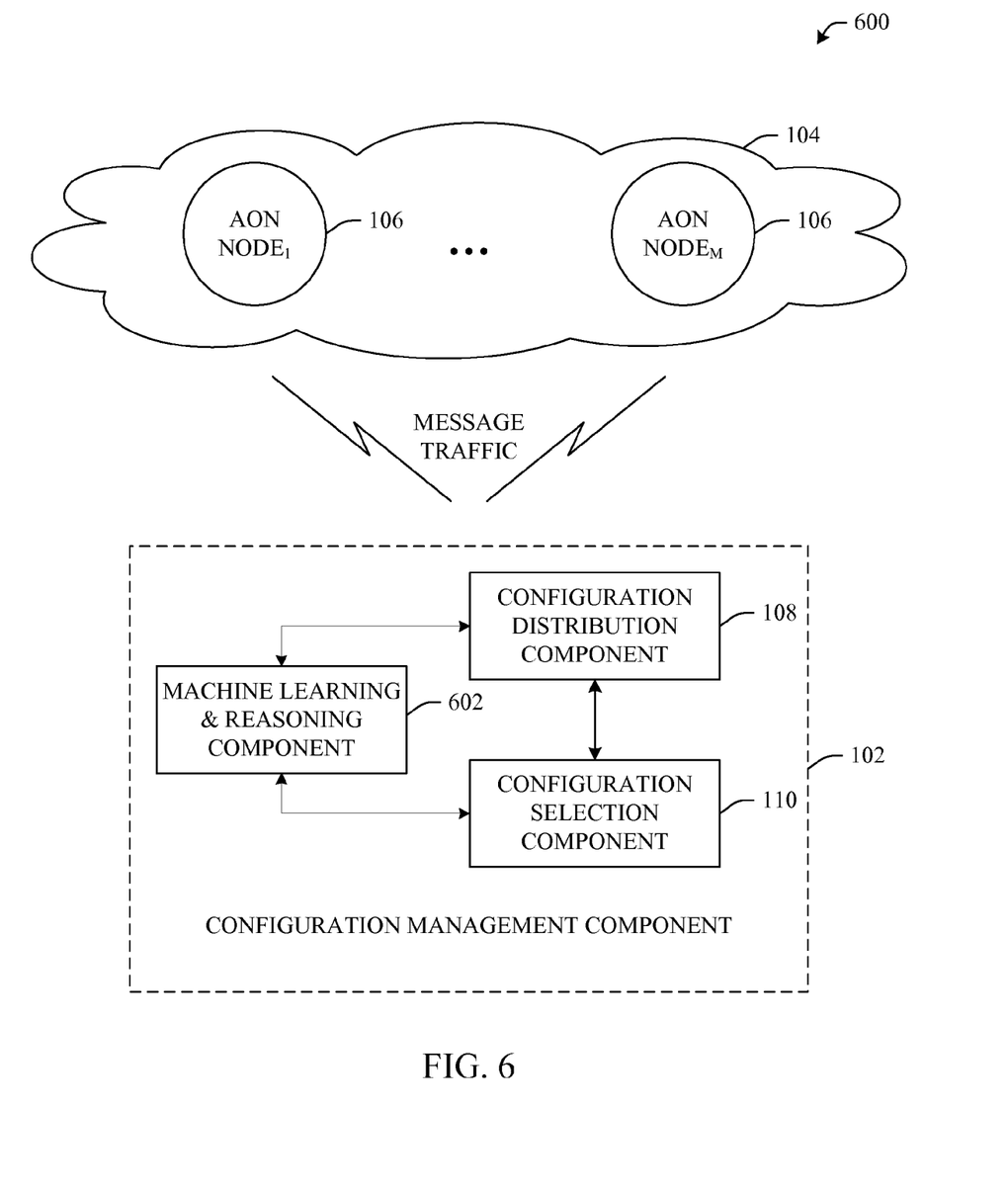
FIG. 6 illustrates block diagram of an example system that employs machine learning and reasoning mechanisms to enhance performance and efficiencies of aspects of the specification.

FIG. 6 illustrates a system 600 that employs a machine learning and reasoning (MLR) component 602 which facilitates automating one or more features in accordance with the subject specification. The subject specification (e.g., in connection with location and/or selection of configurations) can employ various MLR-based schemes for carrying out various aspects thereof. For example, a process for determining which configuration to employ can be facilitated via an automatic classifier system and process. Moreover, where the configuration storage is distributed over various locations, the classifier can be employed to determine which location to access with respect to a given configuration.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject specification can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria where to search for a configuration, which configuration to employ, etc.

Figure 7:
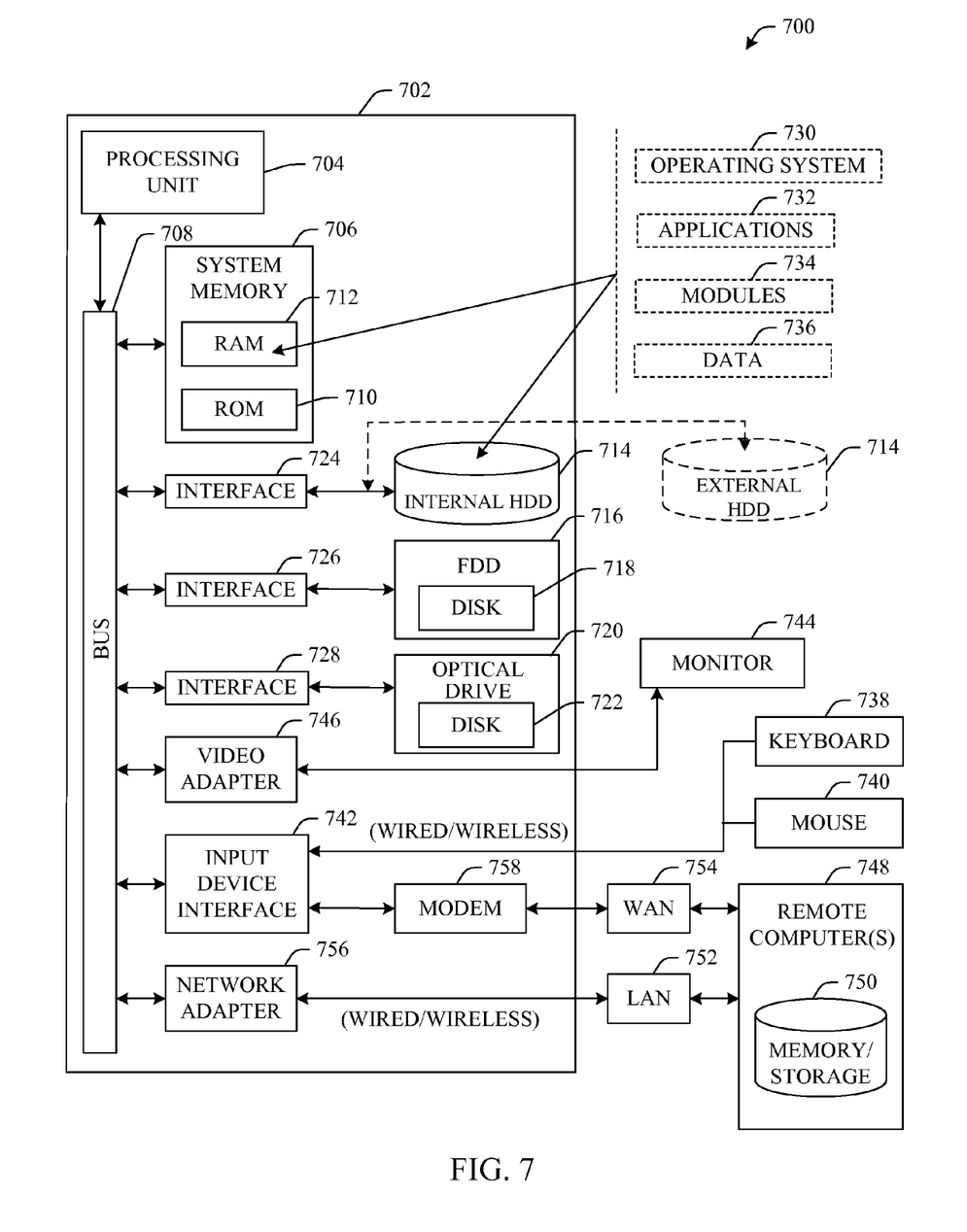
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g. EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g. a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
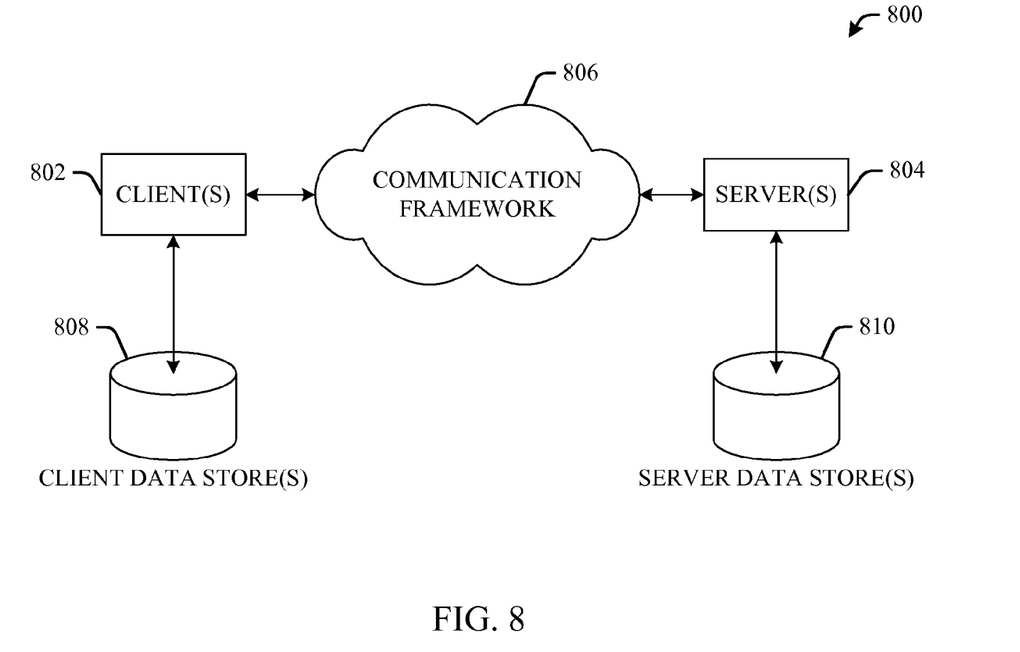
FIG. 8 illustrates a schematic block diagram of an exemplary computing environment in accordance with the subject specification.

Referring now to FIG. 8, there is illustrated a schematic block diagram of an exemplary computing environment 800 in accordance with the subject specification. The system 800 includes one or more client(s) 802. The client(s) 802 can be hardware and/or software (e.g., threads, processes, computing devices). The client(s) 802 can house cookie(s) and/or associated contextual information by employing the specification, for example.

The system 800 also includes one or more server(s) 804. The server(s) 804 can also be hardware and/or software (e.g. threads, processes, computing devices). The servers 804 can house threads to perform transformations by employing the specification, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An application oriented network (AON) node that facilitates configuration instantiation, comprising:
   one or more processors;
   a configuration storage component to maintain a plurality of configurations associated with a plurality of nodes; and
   a configuration selection component to identify, using the one or more processors, a configuration for instantiation at the AON node from the plurality of configurations maintained by the configuration storage component, the configuration selection component to identify the configuration by performing operations to:
   process a plurality of received packets corresponding to a message and assemble message content corresponding to the message from the received packets, the AON node being a target of the message content;
   determine functionalities to manage the message content from the assembled message content;
   determine functionalities supported by the AON node; and
   select the configuration based on the functionalities to manage the message content and based on the functionalities supported by the AON node.

2. The AON node of claim 1, further comprising a traffic analysis component that establishes information related to traffic, the information related to traffic being employed by the configuration selection component to identify the configuration.

3. The AON node of claim 2, wherein the traffic analysis component employs at least one of deep packet inspection or structural inspection to establish information related to traffic.

4. The AON node of claim 2, further comprising:
   a source determination component that establishes a source application, the establishment of the source application being employed by the configuration selection component to identify the configuration.

5. The AON node of claim 1, wherein the configuration selection component employs message content matching against user specified rules to select the configuration.

6. A non-transitory computer-readable medium, having computer executable instructions for performing operations comprising:
   receiving a plurality of application oriented network (AON) configurations;
   determining an AON configuration for instantiation at an AON node from the plurality of AON configurations, the determining comprising:
   processing a plurality of received packets corresponding to a message and assembling message content corresponding to the message from the received packets, the AON node being a target of the message content;
   determining functionalities to manage the message content from the assembled message content;
   determining a capability version of the AON node; and
   selecting the AON configuration based on the functionalities to manage the message content and based on the capability version of the AON node.

7. The non-transitory computer-readable medium of claim 6, further comprising computer executable instructions fur performing an act of executing deep packet inspection upon the plurality of received packets to determine a type assigned to the message content, the type being employed to determine the AON configuration.

8. The non-transitory computer-readable medium of claim 6, further comprising computer executable instructions for performing an act of identifying a party to the the plurality of received packets, the identification of the party being employed to determine the AON configuration.

9. The non-transitory computer-readable medium of claim 6, further comprising computer executable instructions for performing an act of employing a type and a party identification to determine the AON configuration.

10. An apparatus that facilitates runtime identification of a configuration in an application oriented network (AON) environment, the apparatus comprising at least one computer that provides operations for computer-implemented modules including:
    a storage module for storing a plurality of configurations and
    a configuration module for selecting a configuration for instantiation at an AON node from the plurality of configurations as a function of a message, the configuration module comprising:
    a processing module for processing a plurality of received packets corresponding to the message and assembling message content corresponding to the message from the received packets corresponding to the message, the AON node being a target of the message content;
    a functionalities module for determining functionalities to manage the message content by analyzing the message content;
    a capability module for determining a capability version of the AON node; and
    a selection module for selecting the configuration based on the functionalities to manage the message content and based on the capability version of the AON node.

11. The AON node of claim 1, wherein the configuration selection component is further to identify the configuration by performing operations to:
    determine a version of the AON node; and
    select the configuration based on the version of the AON node together with the functionalities to manage the message content and a capability of the functionalities supported by the AON node.

12. The AON node of claim 1, wherein the configuration selection component is further to identify the configuration by performing operations to:
    determine a version of a capability of the functionalities supported by the AON node; and
    select the configuration based on the version of the capability of the functionalities supported by the AON node together with the functionalities to manage the message content.

13. The AON node of claim 1 further comprising:
a destination determination component to identify a destination application, the identified destination application being evaluated by the configuration selection component to identify the configuration.

14. The AON node of claim 2, wherein the traffic analysis component is to identify a nexthop target device, the identified nexthop target device being evaluated by the configuration selection device to select the configuration.

15. The AON node of claim 2, wherein the traffic analysis component is to determine a version of a nexthop target device, the version of the nexthop target device being evaluated by the configuration selection device to select the configuration.

16. The AON node of claim 2, wherein the traffic analysis component is to identify a party to the plurality of packets, the identified party being evaluated to determine the appropriate configuration.

17. The AON node of claim 2, wherein the traffic analysis component is to identify a version of a party to the plurality of packets, the identified version of the party being evaluated to determine the appropriate configuration.

18. The non-transitory computer-readable medium of claim 6, further comprising computer executable instructions for determining a version of the AON node, the version of the AON node being evaluated to determine the AON configuration, 19. The non-transitory computer-readable medium of claim 6, further comprising computer executable instructions for identifying a version of a party to the plurality of packets, the identified version of the party being evaluated to determine the appropriate AON configuration.

20. The AON node of claim 1, wherein the configuration selection component further operates to instantiate the selected configuration at the AON node based on an inspection of the message content at the AON node.

21. The non-transitory computer-readable medium of claim 6, wherein the operations further comprise: instantiating the selected AON configuration at the AON node based on an inspection of the message content at the AON node.

22. The apparatus of claim 10, wherein the corn erne led modules further include:
an instantiating module for instantiating the selected configuration at the AON node based on an inspection of the message content at the AON node.

23. A method comprising:
receiving a plurality of application oriented network (AON) configurations;
determining an AON configuration for instantiation at an AON node from the plurality of AON configurations, the determining comprising:
processing a plurality of received packets corresponding to a message and assembling message content corresponding to the message from the received packets, the AON node being a target of the message content;
determining functionalities to manage the message content from the assembled message content;
determining a capability version of the AON node; and
selecting the AON configuration based on the functionalities to manage the message content and based on the capability version of the AON node.

24. The method of claim 23, further comprising: instantiating the selected AON configuration at the AON node based on an inspection of the message content at the AON node.

25. The method of claim 23, further comprising: assembling the message content by inspecting content fields of the received packets corresponding to a message that is targeted to the AON node.

26. The method of claim 23, further comprising: determining the functionalities to managing the message content by classifying the message content for compatibility with the selected AON configuration, the message content including values from content fields of the received packets corresponding to a message that is targeted to the AON node.

27. The method of claim 23, further comprising: determining the functionalities to managing the message content by classifying the message content for compatibility of an entire message with the selected AON configuration.

28. The method of claim 23, further comprising: using deep content inspection to classify the message content for compatibility of an entire message with the selected AON configuration.

* * * * *